United States Patent
Han et al.

(10) Patent No.: US 10,448,393 B2
(45) Date of Patent: Oct. 15, 2019

(54) METHODS AND APPARATUSES FOR ENABLING PROVISION OF AN ADDITIONAL SPECIAL SUBFRAME CONFIGURATION

(71) Applicant: AVAGO TECHNOLOGIES INTERNATIONAL SALES PTE. LIMITED, Singapore (SG)

(72) Inventors: Jing Han, Beijing (CN); Wei Bai, Beijing (CN); Haiming Wang, Beijing (CN)

(73) Assignee: AVAGO TECHNOLOGIES INTERNATIONAL SALES PTE. LIMITED, Singapore (SG)

( * ) Notice: Subject to any disclaimer, the term of this patent is extended or adjusted under 35 U.S.C. 154(b) by 22 days.

(21) Appl. No.: 15/643,960

(22) Filed: Jul. 7, 2017

(65) Prior Publication Data
US 2017/0374662 A1   Dec. 28, 2017

Related U.S. Application Data

(63) Continuation of application No. 14/401,490, filed as application No. PCT/CN2012/075438 on May 14, 2012, now Pat. No. 9,736,837.

(51) Int. Cl.
*H04W 72/04* (2009.01)
*H04L 5/00* (2006.01)
(Continued)

(52) U.S. Cl.
CPC ....... *H04W 72/0446* (2013.01); *H04L 5/0091* (2013.01); *H04L 5/1469* (2013.01);
(Continued)

(58) Field of Classification Search
None
See application file for complete search history.

(56) References Cited

U.S. PATENT DOCUMENTS

2010/0246456 A1* 9/2010 Suo ............... H04B 7/2656
370/280
2010/0284289 A1* 11/2010 Suo ............... H04W 56/002
370/252
(Continued)

FOREIGN PATENT DOCUMENTS

CN   101729139 A    6/2010
CN   10186027 A    10/2010

OTHER PUBLICATIONS

3GPP TSG RAN RP-120384 "New WI Proposal: Additional Special Subframe Configuration for LTE TDD", which was submitted as prior art by the applicant (Year: 2012).*
(Continued)

*Primary Examiner* — Jamaal Henson
(74) *Attorney, Agent, or Firm* — Xsensus LLP

(57) ABSTRACT

A method, apparatus and computer program product are provided for enabling provision of an additional special subframe configuration to one or more communication devices. A method and apparatus may generate one or more parameters defining a new special subframe configuration associated with downlink communications. The new special subframe configuration is generated in addition to one or more other special subframe configurations. The new special subframe configuration includes information indicating a plurality of downlink symbols that exceed a number of downlink symbols of one of the other special subframe configurations which reduces overlap between a first system and a second system, the plurality of downlink symbols minimize interference between the first and second systems and increases utilization of resources. The method and
(Continued)

| Special subframe configuration | Normal cyclic prefix in downlink | | | Extended cyclic prefix in downlink | | |
|---|---|---|---|---|---|---|
| | DwPTS | UpPTS | | DwPTS | UpPTS | |
| | | Normal cyclic prefix in uplink | Extended cyclic prefix in uplink | | Normal cyclic prefix in uplink | Extended cyclic prefix in uplink |
| 0 | $6592 \cdot T_s$ | | | $7680 \cdot T_s$ | | |
| 1 | $19760 \cdot T_s$ | | | $20480 \cdot T_s$ | $2192 \cdot T_s$ | $2560 \cdot T_s$ |
| 2 | $21952 \cdot T_s$ | $2192 \cdot T_s$ | $2560 \cdot T_s$ | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | | |
| 5 | $6592 \cdot T_s$ | | | $20480 \cdot T_s$ | $4384 \cdot T_s$ | $5120 \cdot T_s$ |
| 6 | $19760 \cdot T_s$ | | | $23040 \cdot T_s$ | | |
| 7 | $21952 \cdot T_s$ | $4384 \cdot T_s$ | $5120 \cdot T_s$ | $12800 \cdot T_s$ | | |
| 8 | $24144 \cdot T_s$ | | | - | - | - |
| 9 | $13168 \cdot T_s$ | | | - | - | - | apparatus may provide a message to one or more communication devices to enable at least a first subset of the communication devices to detect the new special subframe configuration.

20 Claims, 12 Drawing Sheets

(51) Int. Cl.
 *H04L 5/14* (2006.01)
 *H04L 5/22* (2006.01)
 *H04W 72/08* (2009.01)

(52) U.S. Cl.
 CPC .............. *H04L 5/22* (2013.01); *H04W 72/042* (2013.01); *H04W 72/082* (2013.01); *H04L 5/0062* (2013.01)

(56) References Cited

U.S. PATENT DOCUMENTS

| | | | | |
|---|---|---|---|---|
| 2011/0176435 | A1* | 7/2011 | Khandekar | H04L 5/16 370/252 |
| 2011/0292846 | A1* | 12/2011 | Hu | H04W 72/00 370/280 |
| 2013/0083736 | A1* | 4/2013 | Yin | H04W 72/0446 370/329 |
| 2013/0242821 | A1* | 9/2013 | Wei | H04B 7/2615 370/280 |

OTHER PUBLICATIONS

3GPP TSG RAN RP-120384 "New Wi Proposal: Additional Special Subframe Configuration for LTE TDD" submitted in an IDS by the applicant (Year: 2012).*
3GPP TSG RAN RP-120384 "New WI Proposal: Additional special subframe configuration for LTE TDD-Feature Part-V4", Feb. 28-Mar. 2, 2012, 5 pages, Xiamen, China.

* cited by examiner

| Special subframe configuration | Normal cyclic prefix in downlink | | | Extended cyclic prefix in downlink | | |
|---|---|---|---|---|---|---|
| | DwPTS | UpPTS | | DwPTS | UpPTS | |
| | | Normal cyclic prefix in uplink | Extended cyclic prefix in uplink | | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | $12800 \cdot T_s$ | | |
| 8 | $24144 \cdot T_s$ | | | - | - | - |
| 9 | $13168 \cdot T_s$ | | | - | - | - |

FIG. 1

```
-- ASN1START

TDD-Config ::=            SEQUENCE {
    subframeAssignment        ENUMERATED {
                                  sa0, sa1, sa2, sa3, sa4, sa5, sa6},
    specialSubframePatterns   ENUMERATED {
                                  ssp0, ssp1, ssp2, ssp3, ssp4, ssp5, ssp6, ssp7,
                                  ssp8}
}

-- ASN1STOP
```

FIG. 2

```
-- ASN1START

TDD-Config ::=              SEQUENCE {
   subframeAssignment          ENUMERATED {
                                 sa0, sa1, sa2, sa3, sa4, sa5, sa6},
   specialSubframePatterns     ENUMERATED {
                                 ssp0, ssp1, ssp2, ssp3, ssp4,ssp5, ssp6, ssp7,
                                 ssp8}
}

TDD-Config-R11 ::=          SEQUENCE {
   AddspecialSubframePatterns  ENUMERATED {
                                 ssp9, spare3, spare2, spare1)
}

-- ASN1STOP
```

FIG. 6

```
-- ASN1START

AddspecialSubframePatterns    ENUMERATED {
                                ssp9, spare3, spare2, spare1}

-- ASN1STOP
```

FIG. 7

```
-- ASN1START

TDD-Config ::=    SEQUENCE {
  subframeAssignment            ENUMERATED {
                                  sa0, sa1, sa2, sa3, sa4, sa5, sa6},
  specialSubframePatterns       ENUMERATED {
                                  ssp0, ssp1, ssp2, ssp3, ssp4, ssp5, ssp6, ssp7,
                                  ssp8}
}

TDD-Config-R11 ::=
  AddspecialSubframePatterns    SEQUENCE {
                                ENUMERATED {
                                  ssp9, spare3, spare2, spare1}
}

-- ASN1STOP
```

FIG. 8

```
                                    ┌ 8
AddspecialSubframePatterns        (Enabled, Disabled)

-- ASN1STOP
```

FIG. 9

```
                                    ┌ 11
-- ASN1START
TDD-Config ::=     SEQUENCE {
   subframeAssignment    ENUMERATED {
                           sa0, sa1, sa2, sa3, sa4, sa5, sa6},
   specialSubframePatterns  ENUMERATED {
                           ssp0, ssp1, ssp2, ssp3, ssp4, ssp5, ssp6, ssp7,
                           ssp8}

TDD-Config-R11 ::=
   AddspecialSubframePatterns    SEQUENCE {   (Enabled, Disabled)
}

-- ASN1STOP
```

FIG. 10

```
-- ASN1START

SystemInformationBlockType1 ::=    SEQUENCE {
    ...
}

SystemInformationBlockType1-v890-IEs::= SEQUENCE {
    lateNonCriticalExtension        OCTET STRING                        OPTIONAL,   -- Need OP
    nonCriticalExtension            SystemInformationBlockType1-v920-IEs  OPTIONAL
}

SystemInformationBlockType1-v920-IEs ::=   SEQUENCE {
    ims-EmergencySupport-r9         ENUMERATED {true}           OPTIONAL,    -- Need OR
    cellSelectionInfo-v920          CellSelectionInfo-v920      OPTIONAL,    -- Cond RSRQ
    nonCriticalExtension            SEQUENCE {}                 OPTIONAL     -- Need OP
}

SystemInformationBlockType1-v1100-IEs ::=  SEQUENCE {
    TDD-Config                      TDD-Config-R11
 or specialSubframePatterns        AddspecialSubframePatterns (ENUMERATED)
 or specialSubframePatterns        AddspecialSubframePatterns (BOLLEN)
    nonCriticalExtension            SEQUENCE {}                 OPTIONAL     -- Need OP
}

```
-- ASN1START                                                            ┌─17

PRCConnectionReconfiguration ::=    SEQUENCE {
        rrc-TransactionIdentifier       PRC=TransactionIdentifier,
        criticalExtensions              CHOICE {
           c1                              CHOICE {
              rrcConnectionReconfiguration-r8    RRCConnectionReconfiguration-r8-IEs,
              spare7 NULL,
              spare6 NULL, spare5 NULL, spare4 NULL,
              spare3 NULL, spare2 NULL, spare1 NULL
           },
           criticalExtensionsFuture        SEQUENCE {}
        }
}
RRCConnectionReconfiguration-r8-IEs ::= SEQUENCE {
        measConfig                      MeasConfig                  OPTIONAL,  -- Need ON
        mobilityControlInfo             MobilityControlInfo         OPTIONAL,  -- Cond HO
        dedicatedInfoNASList            SEQUENCE (SIZE (1..maxDRB()) OF
                                          DedicatedInfoNAS          OPTIONAL,  -- Cond NONho
        radioResourceConfigDedicated    RadioResourceConfigDedicated OPTIONAL, -- Cond HO-toEUTRA
        securityConfigHO                SecurityConfigHO            OPTIONAL,  -- Cond HO
        nonCriticalExtension            RRCConnectionReconfiguration-v890-IEs  OPTIONAL
}

RRCConnectionReconfiguration-v920-IEs ::= SEQUENCE {
        lateNonCriticalExtension        OCTET STRING                OPTIONAL,  -- Need OP
        nonCriticalExtension            RRCConnectionReconfiguration-v920-IEs  OPTIONAL
}

RRCConnectionReconfiguration-v920-IEs ::= SEQUENCE {
        otherConfig-r9                  OtherConfig-r9              OPTIONAL,  -- Need ON
        fullConfig-r9                   ENUMERATED (true)           OPTIONAL,  -- Cond HO-Reestab
        nonCriticalExtension            RRCConnectionReconfiguration-v1020-IEs OPTIONAL
}

RRCConnectionReconfiguration-v1020-IEs ::= SEQUENCE {
        sCellToReleaseList - r10        SCellToReleaseList - r10    OPTIONAL,  -- Need ON
        sCellToAddModList - r10         SCellToAddModList - r10     OPTIONAL,  -- Need ON
        nonCriticalExtension            SEQUENCE {}                 OPTIONAL,  -- Need OP
}

RRCConnectionReconfiguration-1020-IEs ::= SEQUENCE {
        sCellToReleaseList - r10        SCellToReleaseList - r10    OPTIONAL,  -- Need ON
        sCellToAddMolList - r10         SCellToAddMolList - r10     OPTIONAL,  -- Need ON
        nonCriticalExtension            SEQUENCE {}                 OPTIONAL,  -- Need OP
}

RRCConnectionReconfiguration-v110 -IEs ::= SEQUENCE {
        TDD-Config                      TDD-Config-R11
Or
        specialSubframePatterns         AddSpecialSubframePatterns (ENUMERATED)
or
        specialSubframePatterns         AddspecialSubframePatterns (BOLLEN)
        nonCriticalExtenson             SEQUENCE {}                 OPTIONAL   -- Need OP
}
...
-- ASN1STOP
```

FIG. 12

METHODS AND APPARATUSES FOR ENABLING PROVISION OF AN ADDITIONAL SPECIAL SUBFRAME CONFIGURATION

CROSS-REFERENCE

This application is a continuation of U.S. application Ser. No. 14/401,490, filed May 12, 2015, which is a National Stage of PCT/CN2012/075438, filed May 14, 2012. The entire contents of which are incorporated herein by reference.

TECHNOLOGICAL FIELD

Embodiments of the present invention relate generally to wireless communications technology and, more particularly, to a method and apparatus for enabling provision of one or more additional special subframe configurations.

BACKGROUND

Currently, Long Term Evolution (LTE) Advanced (LTE-A) aims to provide significantly enhanced services by mechanisms of higher data rate and lower latency with reduced cost. The two duplex modes of the LTE-A system are the Frequency-Division Duplex (FDD) mode and the Time-Division Duplex (TDD) mode. For a FDD LTE system, the transmission and reception may be operated on a different frequency, while the TDD LTE system may operate the transmission and reception on the same frequency but at a different subframe. The TDD LTE system typically should also be compatible with a legacy system such as, for example, a Time Division—Synchronous Code Division Multiple Access (TD-SCDMA) system to avoid serious uplink (UL) or downlink (DL) interference because the TDD LTE system and the TD-SCDMA system may share the same site and may operate on an adjacent frequency. To minimize interference, overlap between uplink and downlink even from a different frequency and a different system should typically be avoided. To achieve this, a current or legacy TDD LTE system may utilize a special subframe configuration (also referred to herein as special subframe configuration 5) which may need to be configured to guarantee there is no uplink and downlink overlap between the LTE system and the TD-SCDMA system. The special subframe configuration may have, for example, a. Downlink Pilot Time Slot (DwPTS) of three symbols, a Guard Period (GP) of nine symbols and a Uplink Pilot Time Slot (UpPTS) of two symbols (e.g. DwPTS:GP:UpPTS=3:9:2).

To further increase the resource efficiency, LTE-Advanced Release 11 (also referred to herein as Rel-11) is currently agreeing to/approving an additional special subframe configuration (also referred to herein as special subframe configuration 9) corresponding to, for example, a DwPTS of six symbols, a GP of six symbols and a UpPTS of two symbols (e.g. DwPTS:GP:UpPTS=, 6:6:2) for a normal Cyclic Prefix (CP). At present, there is no suitable corresponding signaling procedure to support this additional special subframe configuration (e.g., special subframe configuration 9 for normal CP).

In view of these drawbacks, it may be beneficial to provide an efficient and reliable mechanism for providing a signaling procedure to support additional special subframe configurations.

BRIEF SUMMARY

A method, apparatus and computer program product are therefore provided according to an example embodiment in order to provide an efficient and reliable manner for configuring one or more new special subframe configurations. In this regard, for instance, an example embodiment may provide a signaling procedure to support a new special subframe configuration(s) (e.g., special subframe configuration 9, special subframe configuration 7, etc.).

In an example embodiment, a new special subframe configuration may be configured in a backward compatible manner. For instance, new User Equipment (UE) may first read a legacy configuration such as, for example, special subframe configuration 5 in a message (e.g., a System Information Block Type 1 (SIB1) message, UE dedicated RRC (Radio Resource Control) signal(s) (e.g., a RRCConnectionReconfiguration message)), and subsequently a network device (e.g., an evolved node B (eNB)) may use dedicated signaling provided to the UE to switch on the new configuration if needed, or may define implicit rules to inform the new UE presuming that the new UE is using a new special subframe configuration (e.g., special subframe configuration 9).

In an example embodiment, a network device (e.g., an eNB) may define a RRC parameter(s) and/or an information element(s) (IE(s)) for the additional special subframe configuration (e.g., special subframe configuration 9). In this regard, for example, the network device may define a new version of a TDD Configuration (Config) IE (TDD-Config IE), which may be used to indicate both a legacy special subframe configuration (e.g., special subframe configuration 5) and the additional special subframe configuration (e.g., special subframe configuration 9) for new release TDD UEs (e.g., Rel-11 compatible UEs).

In another example embodiment, a network device (e.g., an eNB) may define a new parameter(s) and/or one or more information elements for the additional special subframe configuration (e.g., special subframe configuration 9) and may reserve one or more spare values for future extension (e.g., new special subframe configurations (e.g., a special subframe configuration 10, etc.).

In another example embodiment, a network device may define a new parameter(s) or one or more information elements for switching on/off of an additional special subframe configuration (e.g., a special subframe configuration 9, a special subframe configuration 7). In addition, the network device may map the additional special subframe configuration to the legacy special subframe configuration. For example, the network device (e.g., an eNB) may map the special subframe configuration 9 to the special subframe configuration 5 for a normal Cyclic Prefix. As such, in an instance in which a UE detects special subframe configuration 5 sent in a message by the network device, the UE may determine that the special subframe configuration 5 is mapped to special subframe configuration 9. In this regard, in an instance in which a switching bit indicates that the special subframe configuration 9 is enabled, the UE may configure the special subframe configuration 9 for communications with the network device (e.g., eNB).

In another example embodiment, a network device (e.g., an eNB) may define one or more RRC parameters or one or more information elements of the additional special subframe configuration (e.g., special subframe configuration 9) to be indicated in broadcast signaling (e.g., a SIB1 message) or UE dedicated RRC signaling (e.g. RRCConnectionReconfiguration message). In other words, the network device may send a UE(s) a SIB1 message that includes the additional special subframe configuration (e.g., special subframe configuration 9) or may send a UE(s) one or more UE dedicated RRC signals that includes the additional special subframe configuration.

In another example embodiment, a network device (e.g., an eNB) may provide a message to a UE(s) including the new legacy special subframe configuration. In this regard, a new release TDD UE(s) (e.g., Rel-11 compliant UEs) may detect the legacy special subframe configuration and may configure or map a legacy special subframe configuration (e.g., special subframe configuration 5) indicated in the message (e.g., a SIB1 message) to an additional special subframe configuration (e.g., special subframe configuration 9). In this regard, a UE (e.g., a Rel-11 TDD UE) may configure an additional special subframe configuration (e.g., additional special subframe configuration 9) in response to detecting the legacy special subframe confirmation (e.g., special subframe configuration 5) in the message.

In one example embodiment, a method is provided that generates one or more parameters defining a new special subframe configuration associated with downlink communications. The new special subframe configuration is generated in addition to one or more other special subframe configurations. The new special subframe configuration includes information indicating a plurality of downlink symbols that exceed a number of downlink symbols of at least one of the other special subframe configurations which reduces overlap between a first system and a second system. The plurality of downlink symbols minimize an interference between the first system and the second system and increases utilization of resources. The method further comprises enabling provision of a message to one or more communication devices to enable at least a first subset of the communication devices to detect the new special subframe configuration.

In another example embodiment, an apparatus is provided that includes at least one processor and at least one memory including computer program code with the at least one memory and the computer program code being configured to, with the at least one processor cause the apparatus at least to generate one or more parameters defining a new special subframe configuration associated with downlink communications. The new special subframe configuration is generated in addition to one or more other special subframe configurations. The new special subframe configuration includes information indicating a plurality of downlink symbols that exceed a number of downlink symbols of at least one of the other special subframe configurations which reduces overlap between a first system and a second system. The plurality of downlink symbols minimize an interference between the first system and the second system and increases utilization of resources. The at least one memory and the computer program code are also configured to, with the at least one processor, cause the apparatus to enable provision of a message to one or more communication devices to enable at least a first subset of the communication devices to detect the new special subframe configuration.

In another example embodiment, an apparatus includes means for generating one or more parameters defining a new special subframe configuration associated with downlink communications. The new special subframe configuration is generated in addition to one or more other special subframe configurations. The new special subframe configuration includes information indicating a plurality of downlink symbols that exceed a number of downlink symbols of at least one of the other special subframe configurations which reduces overlap between a first system and a second system. The plurality of downlink symbols minimize an interference between the first system and the second system and increases utilization of resources. The apparatus also includes means for enabling provision of a message to one or more communication devices to enable at least a first subset of the communication devices to detect the new special subframe configuration.

In another example embodiment, a method is provided that receives a message from a network device. The message includes one or more special subframe configuration parameters. The method may further include analyzing the message to determine whether the parameters identify a defined new special subframe configuration associated with downlink communications in which the new special subframe configuration is generated in addition to one or more other special subframe configurations. The new special subframe configuration includes information indicating a plurality of downlink symbols that exceed a number of downlink symbols of at least one of the other special subframe configurations which reduces overlap between a first system and a second system. The plurality of downlink symbols minimize an interference between the first system and the second system and increases utilization of resources.

In another example embodiment, an apparatus is provided that includes at least one processor and at least one memory including computer program code with the at least one memory and the computer program code being configured to, with the at least one processor cause the apparatus at least to receives a message from a network device. The message includes one or more special subframe configuration parameters. The at least one memory and the computer program code are also configured to, with the at least one processor, cause the apparatus to analyze the message to determine whether the parameters identify a defined new special subframe configuration associated with downlink communications in which the new special subframe configuration is generated in addition to one or more other special subframe configurations. The new special subframe configuration includes information indicating a plurality of downlink symbols that exceed a number of downlink symbols of at least one of the other special subframe configurations which reduces overlap between a first system and a second system. The plurality of downlink symbols minimize an interference between the first system and the second system and increases utilization of resources.

In another example embodiment, an apparatus includes means for receiving a message from a network device. The message includes one or more special subframe configuration parameters. The apparatus may also include means for analyzing the message to determine whether the parameters identify a defined new special subframe configuration associated with downlink communications in which the new special subframe configuration is generated in addition to one or more other special subframe configurations. The new special subframe configuration includes information indicating a plurality of downlink symbols that exceed a number of downlink symbols of at least one of the other special subframe configurations which reduces overlap between a first system and a second system. The plurality of downlink symbols minimize an interference between the first system and the second system and increases utilization of resources.

BRIEF DESCRIPTION OF THE SEVERAL VIEWS OF THE DRAWINGS

Figure 3:
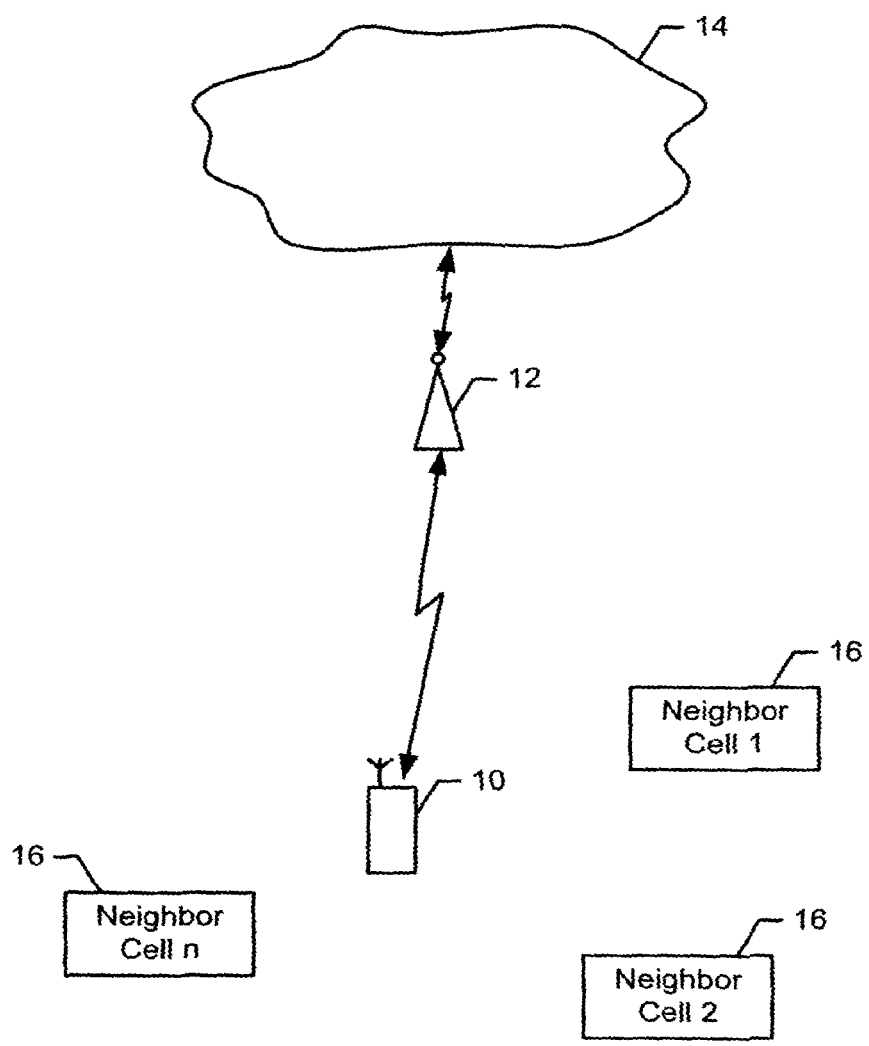
Figure 4:
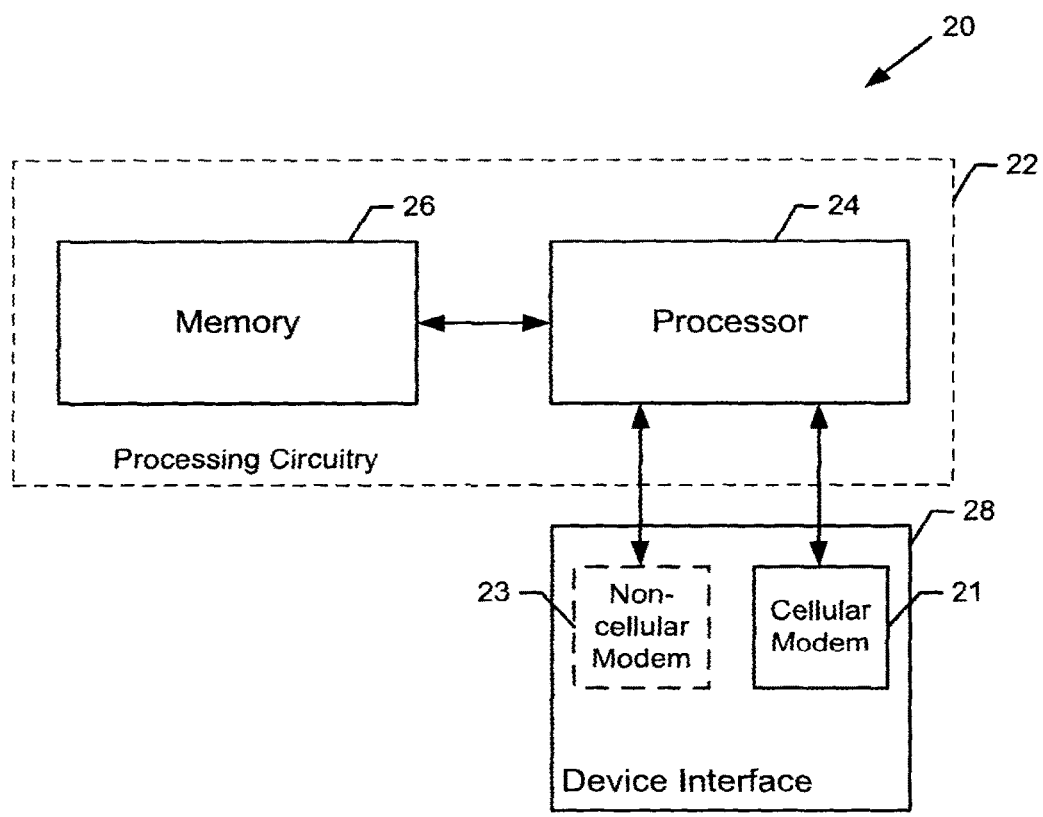
Figure 5:
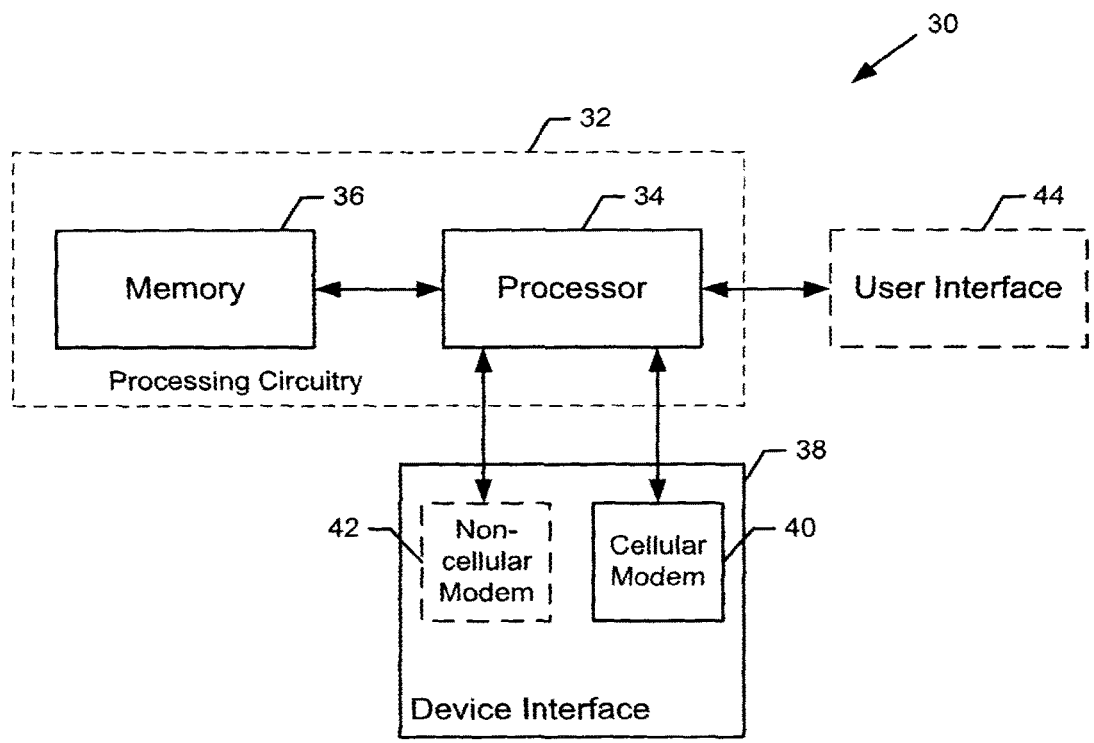
Figure 13:
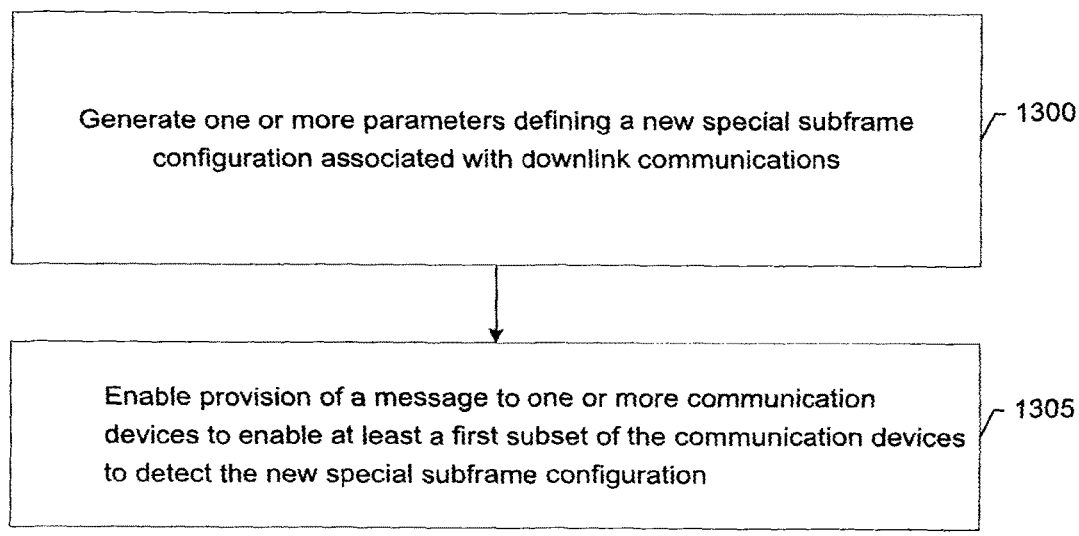
Figure 14:
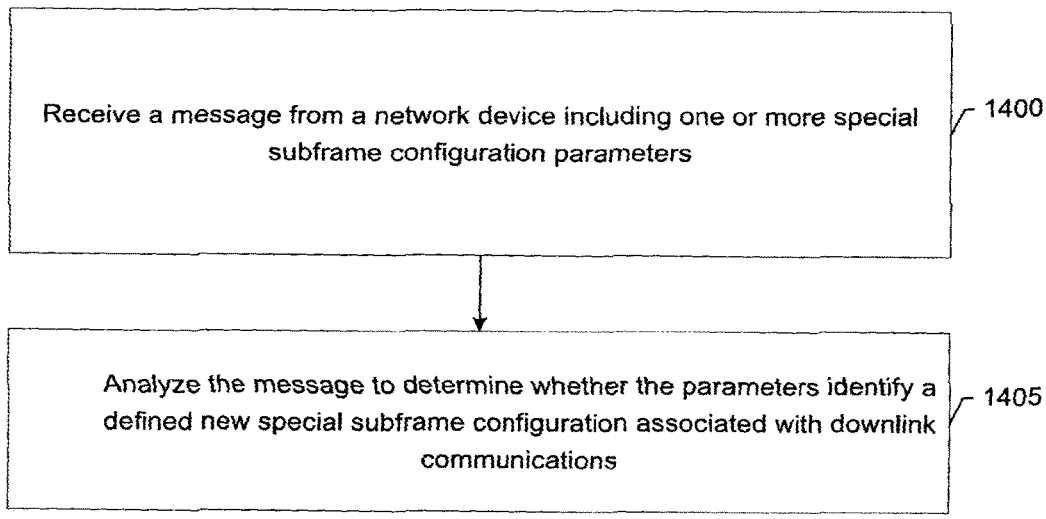

Having thus described the invention in general terms, reference will now be made to the accompanying drawings, which are not necessarily drawn to scale, and wherein:

FIG. 1 is a diagram of a table including special subframe configurations according to an example embodiment;

FIG. 2 is a diagram of a TDD Configuration information element;

FIG. 3 is a schematic representation of a system that may benefit from an example embodiment;

FIG. 4 is a schematic block diagram of an apparatus from the perspective of a base station in accordance with an example embodiment;

FIG. 5 is a block diagram of an apparatus that may be embodied by a mobile terminal in accordance with an example embodiment;

FIG. 6 is a diagram of a TDD Configuration information element according to an example embodiment;

FIG. 7 is a diagram of a new parameter defined for an additional special subframe configuration according to an example embodiment;

FIG. 8 is a diagram of the new parameter defined for the additional special subframe configuration included in a TDD Configuration information element according to an example embodiment;

FIG. 9 is a diagram of a new parameter defined for switching on/off of an additional special subframe configuration according to an example embodiment;

FIG. 10 is a diagram of the new parameter defined for switching on/off of the additional special subframe configuration included in a TDD Configuration information element according to an example embodiment;

FIG. 11 is a diagram of a System Information Block Type 1 message according to an example embodiment;

FIG. 12 is a diagram of a RRCConnectionReconfiguration message according to an example embodiment;

FIG. 13 is a flowchart illustrating operations performed in accordance with one example embodiment; and FIG. 14 is a flowchart illustrating operations performed in accordance with another example embodiment.

DETAILED DESCRIPTION

The present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

As used in this application, the term 'circuitry' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or application specific integrated circuit for a mobile phone or a similar integrated circuit in server, a cellular network device, or other network device.

As defined herein a "computer-readable storage medium," which refers to a non-transitory, physical or tangible storage medium (e.g., volatile or non-volatile memory device), may be differentiated from a "computer-readable transmission medium," which refers to an electromagnetic signal.

The additional special subframe configuration 9 for normal Cyclic Prefix and the additional special subframe configuration 7 for extended Cyclic Prefix are currently being agreed to/approved for usage in LTE-Advanced Release 11 to further increase resource efficiency and minimize interference (e.g., uplink and downlink interference) between a TDD LTE system and a TD-SCDMA system, for example.

The additional special subframes, currently being agreed to, are shown in the table of FIG. 1. For instance, as shown in the table of FIG. 1, the special subframe configuration 9 for a normal Cyclic Prefix and the special subframe configuration 7 for an extended Cyclic Prefix are shown in FIG. 1.

At present, in current approaches, the legacy special subframe configurations (e.g., special subframe configurations 0-8) are indicated in RRC signaling, which is typically associated with a specialSubframePatterns in a TDD-Config information element (IE) 2, as shown in FIG. 2.

The problem is that the specialSubframePatterns of the TDD-Config IE typically has no spare status for inclusion of the additional special subframe configuration 9 for normal CP and/or the special subframe configuration 7 for extended CP. As such, the special subframe configuration 9 for normal CP and/or the special subframe configuration 7 for extended CP may not be included in and utilized in currently existing signaling techniques.

In view of the following drawbacks, it may be beneficial to provide an efficient and reliable mechanism of enabling provision of signaling and procedures supporting additional special subframe configurations.

Referring now to FIG. 3, a system according to an example embodiment is provided. The system of FIG. 3 includes a first communication device (e.g., mobile terminal 10) that is capable of communication via a serving cell 12, such as a base station, a Node B, an evolved Node B (eNB), a radio network controller (RNC) or other access point, with a network 14 (e.g., a core network). While the network may be configured in accordance with Universal Mobile Telecommunications System (UMTS), Long Term Evolution (LTE) or LTE-Advanced (LTE-A), other networks may support the method, apparatus and computer program product of embodiments of the present invention including those configured in accordance with wideband code division multiple access (W-CDMA), CDMA2000, global system for mobile communications (GSM), general packet radio service (GPRS) and/or the like.

The network 14 may include a collection of various different nodes, devices or functions that may be in communication with each other via corresponding wired and/or wireless interfaces. For example, the network may include one or more cells, including serving cell 12 and one or more neighbor cells 16 (designated neighbor cell 1, neighbor cell 2, . . . neighbor cell n in the embodiment of FIG. 3), each of which may serve a respective coverage area. The serving cell and the neighbor cells could be, for example, part of one or more cellular or mobile networks or public land mobile networks (PLMNs). In turn, other devices such as processing devices (e.g., personal computers, server computers or the like) may be coupled to the mobile terminal 10 and/or other communication devices via the network.

A communication device, such as the mobile terminal 10 (also referred to herein as User Equipment (UE) 10), may be in communication with other communication devices or other devices via the serving cell 12 and, in turn, the network 14. In some cases, the communication device may include an antenna for transmitting signals to and for receiving signals from a serving cell.

In some example embodiments, the mobile terminal 10 may be a mobile communication device such as, for example, a mobile telephone, portable digital assistant (PDA), pager, laptop computer, or any of numerous other hand held or portable communication devices, computation devices, content generation devices, content consumption devices, or combinations thereof. As such, the mobile terminal 10 may include one or more processors that may define processing circuitry either alone or in combination with one or more memories. The processing circuitry may utilize instructions stored in the memory to cause the mobile terminal 10 to operate in a particular way or execute specific functionality when the instructions are executed by the one or more processors. The mobile terminal 10 may also include communication circuitry and corresponding hardware/software to enable communication with other devices and/or the network 14.

In one embodiment, for example, a neighbor cell 16 and/or the serving cell 12 (also referred to herein as eNB 12) may be embodied as or otherwise include an apparatus 20 as generically represented by the block diagram of FIG. 4. Additionally, in one example embodiment, the mobile terminal 10 may be embodied as or otherwise include an apparatus 30 as generically represented by the block diagram of FIG. 5. While the apparatus 20 may be employed, for example, by a serving cell 12, or a neighbor cell 16 and the apparatus 30 may be employed, for example, by a mobile terminal 10, it should be noted that the components, devices or elements described below may not be mandatory and thus some may be omitted in certain embodiments. Additionally, some embodiments may include further or different components, devices or elements beyond those shown and described herein.

As shown in FIG. 4, the apparatus 20 may include or otherwise be in communication with a processing system including, for example, processing circuitry 22 that is configurable to perform actions in accordance with example embodiments described herein. The processing circuitry may be configured to perform data processing, application execution and/or other processing and management services according to an example embodiment of the invention. In some example embodiments, the apparatus or the processing circuitry may be embodied as a chip or chip set. In other words, the apparatus or the processing circuitry may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus or the processing circuitry may therefore, in some cases, be configured to implement an embodiment of the present invention on a single chip or as a single "system on a chip." As such, in some cases, a chip or chipset may constitute means for performing one or more operations for providing the functionalities described herein.

In an example embodiment, the processing circuitry 22 may include a processor 24 and memory 26 that may be in communication with or otherwise control a device interface 28. As such, the processing circuitry may be embodied as a circuit chip (e.g., an integrated circuit chip) configured (e.g., with hardware, software or a combination of hardware and software) to perform operations described herein in relation to the apparatus 20. In an alternative example embodiment, the processing circuitry 22 may be embodied in a modem (e.g., cellular modem 21).

The device interface 28 may include one or more interface mechanisms for enabling communication with other devices, such as one or more mobile terminals 10. In some cases, the device interface may be any means such as a device or circuitry embodied in either hardware, or a combination of hardware and software that is configured to receive and/or transmit data from/to a network and/or any other device or module in communication with the processing circuitry 22. In this regard, the device interface may include, for example, an antenna (or multiple antennas) and supporting hardware and/or software for enabling communications with a wireless communication network and/or a communication modem, such as a cellular modem 21 (e.g., a UMTS modem, a LTE modem, etc.), and/or an optional non-cellular modem 23 (e.g., a Wireless Fidelity (WiFi) modem, a Wireless Local Area Network (WLAN) modem, etc.) for enabling communications with other terminals (e.g., WiFi terminals, WLAN terminals, APs, etc).

In an example embodiment, the memory 26 may include one or more non-transitory memory devices such as, for example, volatile and/or non-volatile memory that may be either fixed or removable. The memory may be configured to store information, data, applications, instructions or the like for enabling the apparatus 20 to carry out various functions in accordance with example embodiments of the present invention. For example, the memory could be configured to buffer input data for processing by the processor 24. Additionally or alternatively, the memory could be configured to store instructions for execution by the processor. As yet another alternative, the memory may include one of a plurality of databases that may store a variety of files, contents or data sets. Among the contents of the memory, applications may be stored for execution by the processor in order to carry out the functionality associated with each respective application. In some cases, the memory may be in communication with the processor via a bus for passing information among components of the apparatus.

The processor 24 may be embodied in a number of different ways. For example, the processor may be embodied as various processing means such as one or more of a microprocessor or other processing element, a coprocessor, a controller or various other computing or processing devices including integrated circuits such as, for example, an application specific integrated circuit (ASIC), a field programmable gate array (FPGA), or the like. In an example embodiment, the processor may be configured to execute instructions stored in the memory 26 or otherwise accessible to the processor. As such, whether configured by hardware or by a combination of hardware and software, the processor may represent an entity (e.g., physically embodied in circuitry—in the form of processing circuitry 22) capable of performing operations according to embodiments of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the operations described herein.

In one embodiment, the mobile terminals 10 may be embodied as or otherwise include an apparatus 30 as generically represented by the block diagram of FIG. 5. In this regard, the apparatus may be configured to provide for communications with the eNB 12 or another terminal(s) via communications system (e.g., a LTB, a LTE-A). While the apparatus may be employed, for example, by a mobile terminal, it should be noted that the components, devices or elements described below may not be mandatory and thus some may be omitted in certain embodiments. Additionally, some embodiments may include further or different components, devices or elements beyond those shown and described herein.

As shown in FIG. 5, the apparatus 30 may include or otherwise be in communication with a processing system including, for example, processing circuitry 32 that is configurable to perform actions in accordance with example embodiments described herein. The processing circuitry may be configured to perform data processing, application execution and/or other processing and management services according to an example embodiment of the present invention. In some embodiments, the apparatus or the processing circuitry may be embodied as a chip or chip set. In other words, the apparatus or the processing circuitry may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus or the processing circuitry may therefore, in some cases, be configured to implement an embodiment of the present invention on a single chip or as a single "system on a chip." As such, in some cases, a chip or chipset may constitute means for performing one or more operations for providing the functionalities described herein.

In an example embodiment, the processing circuitry 32 may include a processor 34 and memory 36 that may be in communication with or otherwise control a device interface 38 and, in some cases, a user interface 44. As such, the processing circuitry may be embodied as a circuit chip (e.g., an integrated circuit chip) configured (e.g., with hardware, software or a combination of hardware and software) to perform operations described herein. However, in some embodiments taken in the context of the mobile terminal, the processing circuitry may be embodied as a portion of a mobile computing device or other mobile terminal. In an alternative example embodiment, the processing circuitry 32 may be embodied in a modem (e.g., cellular modem 40).

The optional user interface 44 may be in communication with the processing circuitry 32 to receive an indication of a user input at the user interface and/or to provide an audible, visual, mechanical or other output to the user. As such, the user interface in the context of a mobile terminal may include, for example, a keyboard, a mouse, a joystick, a display, a touch screen, a microphone, a speaker, and/or other input/output mechanisms.

The device interface 38 may include one or more interface mechanisms for enabling communication with other devices and/or networks. In some cases, the device interface may be any means such as a device or circuitry embodied in either hardware, or a combination of hardware and software that is configured to receive and/or transmit data from/to a network and/or any other device or module in communication with the processing circuitry 32. In this regard, the device interface may include, for example, an antenna (or multiple antennas) and supporting hardware and/or software for enabling communications with a wireless communication network and/or a communication modem or other hardware/software for supporting communication via cable, digital subscriber line (DSL), universal serial bus (USB), Ethernet or other methods. In the illustrated embodiment, for example, the device interface includes a cellular modem 40 (e.g., a LTE modem, a LTE-A modem, etc.) for supporting communications with the eNB 12 and an optional non-cellular modem 42 (e.g., a WiFi modem, WLAN modem, Bluetooth (BT) modem, etc.) for supporting communications with other terminals (e.g., a WiFi station(s), a WLAN station(s)), etc.).

In an example embodiment, the memory 36 may include one or more non-transitory memory devices such as, for example, volatile and/or non-volatile memory that may be either fixed or removable. The memory may be configured to store information, data, applications, instructions or the like for enabling the apparatus 30 to carry out various functions in accordance with example embodiments of the present invention. For example, the memory could be configured to buffer input data for processing by the processor 34. Additionally or alternatively, the memory could be configured to store instructions for execution by the processor. As yet another alternative, the memory may include one of a plurality of databases that may store a variety of files, contents or data sets. Among the contents of the memory, applications may be stored for execution by the processor in order to carry out the functionality associated with each respective application. In some cases, the memory may be in communication with the processor via a bus for passing information among components of the apparatus.

The processor 34 may be embodied in a number of different ways. For example, the processor may be embodied as various processing means such as one or more of a microprocessor or other processing element, a coprocessor, a controller or various other computing or processing devices including integrated circuits such as, for example, an ASIC, an FPGA or the like. In an example embodiment, the processor may be configured to execute instructions stored in the memory 36 or otherwise accessible to the processor. As such, whether configured by hardware or by a combination of hardware and software, the processor may represent an entity (e.g., physically embodied in circuitry—in the form of processing circuitry 32) capable of performing operations according to embodiments of the present invention while configured accordingly. Thus, for example when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the operations described herein.

In some example embodiments, the new special subframe configuration 9 (e.g., DwPTS:GP:UpPTS=6:6:2) for normal CP may be used for UBs that are compliant with Rel-11 (also referred to herein as new TDD UEs) in an instance in which special subframe configuration 5 (e.g., DwPTS:GP:UpPTS=3:9:2) for normal CP is configured for legacy UEs (e.g., UEs that are non-compliant with Rel-11), to further increase the resource utilization (e.g., transmission of downlink data) based in part on additional orthogonal frequency-division multiplexing (OFDM) symbols (e.g., three additional OFDM symbols) to minimize interference between a LTE TDD system and a TD-SCDMA system. Additionally, in some other example embodiments, the additional special subframe configuration 7 for extended CP may be used for new TDD UEs in an instance in which special subframe configuration 4 for extended CP is configured for usage by legacy TDD UEs.

In an example embodiment, the processor (e.g., processor 24) of the eNB 12 may generate one or more RRC parameters and/or one or more information elements that are defined for the additional special subframe configuration (e.g., special subframe configuration 9) (e.g., defined explicitly in RRC signaling).

In this example embodiment, the processor 24 of the eNB 12 may generate and define a new TDD-Config IE, to indicate both a legacy special subframe configuration (e.g., special subframe configurations 0-8 for normal CP) and an additional special subframe configuration (e.g., special subframe configuration 9 for normal CP) for one or more UEs 10 (e.g., new release (e.g., Rel-11) TDD UEs). The example is given in the following Referring now to FIG. 6, a diagram of a TDD-Config information element is provided according to an example embodiment. The processor 24 of the eNB 12 may generate the TDD-Config information element 4. As shown in FIG. 6, the TDD-Config information element 4 may include indications of legacy special subframe configurations (e.g., special subframe pattern (asp) 0 (ssp0), ssp1, ssp2, ssp3, ssp4, ssp5, ssp6, ssp7 and ssp8) and the additional special subframe configuration 9 (e.g., ssp9) for normal CP associated with TDD-Config-R11 (e.g., LTE-A Release 11). In addition, the processor 24 of the eNB 12 may include indicia in the TDD-Config information element 4 indicating a spare 1 and spare 2. Spare 1 and spare 2 may be special subframe configuration values reserved for future use. In this regard, for purposes of illustration and not of limitation, in an instance in which one or more new special subframe configurations are defined in the future, one or more of these new special subframe configurations may utilize the spare 1 (e.g., a special subframe configuration 10 may use spare 1) and/or spare 2 (e.g., a special subframe configuration 11 may use spare 2) information elements.

In an alternative example embodiment, the processor 24 of the eNB 12 may define one or more new RRC parameters and/or one or more new information elements to include the additional special subframe configuration and also one or more spare values. In this regard, as shown in FIG. 7, the processor of the eNB 12 may define and generate a new RRC parameter 5 that includes the additional special subframe 9 (e.g., ssp9) and spare values (e.g., spare1, spare2, spare3) for future use. For purposes of illustration and not of limitation, one or more of the spare values (e.g., spare1) may be utilized for a future extension (e.g., special subframe configuration 10) which has DwPTS:GP:UpPTS=6:7:1, for example.

Referring to FIG. 8, a diagram of a TDD-Config information element that includes the new RRC parameter 5 is provided according to an example embodiment. In this regard, the processor 24 of the eNB 12 may include the indications of the additional special subframe 9 (ssp9) and the sparse values (e.g., spare1, spare2, spare3) associated with the TDD-Config R11 in the newly generated TDD-Config information element 7.

Referring now to FIG. 9, a diagram of a new parameter or information element defined for switching an additional special subframe configuration on or off is provided according to an example embodiment. In this example embodiment, the processor 24 of the eNB 12 may generate and define the new parameter and/or information element for switching on/off of the additional special subframe configuration. The new parameter 8 (also referred to herein as information element 8) generated by the processor 24 of the eNB 12 may define a 1-bit switching parameter to indicate whether the additional special subframe configuration 9 is enabled or disabled. In this example embodiment, the processor 24 of the eNB 12 may designate or define a mapping (e.g., in a one-to-one relationship) between a legacy special subframe configuration such as, for example, special subframe configuration 5 and the additional special subframe configuration 9.

In addition, in one example embodiment, the additional special subframe configuration may be mapped by the processor 24 of eNB 12 to a legacy special subframe configuration(s) to allow extension ability for future releases of special subframe configurations. As such, an eNB (e.g., eNB 12) and a UE (e.g., UE 10) may know which additional special subframe configuration (e.g., additional special subframe configuration 9) is switched on in an instance in which there are several additional special subframe configurations for future releases.

In an instance in which the eNB 12 provides a message to the UE 10 indicating that the special subframe configuration 5 is included in the message (e.g., SIB1) and a value (e.g., a value of 1) of the 1-bit switching parameter indicates that the additional special subframe configuration 9 is switched on (e.g., a value of 1 for the bit) for new release TDD UEs, the processor 34 of the UB 10 (e.g., a TDD Rel-11 UE) may detect the special subframe configuration 5. In response to detecting the special subframe configuration 5 and an indication that the 1-bit switching parameter indicates that the additional special subframe configuration 9 is switched on, the processor of the UE 10 may determine that the special subframe configuration 5 is mapped to the special subframe configuration 9 based in part on the defined relationship. In this regard, the processor 34 of the UE 10 may utilize the additional special subframe configuration 9 in communicating with the eNB 12. On the other hand, in an instance in which the processor 34 of the UE 10 detects that the 1-bit switching parameter indicates that the additional special subframe 9 is switched off (e.g., a value of the 1-bit switching parameter is zero), the processor 34 of the UE 10 may utilize the special subframe configuration 5 but may be unable to use the additional special subframe configuration 9 since it is disabled.

By defining a mapped relationship between the additional special subframe configuration 9 and a legacy special subframe configuration such as, for example, special subframe configuration 5 and utilizing a 1-bit switching parameter to indicate whether the additional special subframe configuration 9 is switched on or off, the processor 24 of the eNB 12 is capable of minimizing signaling overhead.

In another example embodiment, the processor 24 of the eNB 12 may define a mapped relationship between legacy special subframe configuration 4 for extended CP and the additional special subframe configuration 7 for extended CP. As such, in an instance in which the eNB 12 provides a message to a UE 10 indicating that the special subframe configuration 4 for extended CP is included in a message (e.g., SIB1) and a value (e.g., a value of one) of the 1-bit switching parameter indicates that the additional special subframe configuration 4 for extended CP is switched on for new release TDD UEs, the processor 34 of the UE 10 (e.g., a TDD Rel-11 UE) may detect the special subframe configuration 4. In response to detecting the special subframe configuration 4 and an indication that the 1-bit switching parameter indicates that the additional special subframe 4 is switched on, the processor 34 of the UBE 10 may determine that the special subframe configuration 4 is mapped to the special subframe configuration 7 for extended CP. In this manner, the processor 34 of the UE 10 may utilize the additional special subframe configuration 7 for extended CP in communicating with the eNB 12. On the other hand, in an instance in which the processor 34 of the UE 10 detects that the 1-bit switching parameter indicates that the additional special subframe 4 for extended CP is switched off (e.g., a value of the 1-bit switching parameter is zero), the processor 34 of the UE 10 may utilize the special subframe configuration 4 for extended CP but may be unable to use the additional special subframe configuration 7 for extended CP since it is disabled.

Referring now to FIG. 10, a diagram of another TDD-Config information element is provided according to an example embodiment. In the example embodiment of FIG. 10, the processor 24 of the eNB 12 may include the new parameter 8 defined for switching on/off the additional special subframe configuration in the TDD-Config information element 11.

In another example embodiment, the processor 24 of the eNB 12 may include one or more new defined RRC parameters and/or one or more information elements associated with an additional special subframe configuration in broadcast signaling such as, for example, in a System Information Block Type 1 (SIB1) message. The one or more new defined RRC parameters and/or information elements included in the SIB1 message may include, but are not limited to, the TDD-Config information element 4, the new RRC parameter 5, the TDD-Config information element 7, new parameter 8, and/or TDD-Config information element 11 which are associated with TDD-Config-R11 (e.g., LTE-A Release 11).

Referring now to FIG. 11, a diagram of a System Information Block Type 1 message is provided according to an example embodiment. The processor 24 of the eNB 12 may generate the SIB1 message 15 to include one or more new RRC parameters and/or one or more information elements associated with the additional special subframe 9 corresponding to a TDD-Config-R11.

The processor 24 of eNB 12 may provide the SIB1 message 15 to one or more UEs. In an instance in which the UEs 10 are TDD Rel-11 UEs, the processor 34 of the UEs 10 may analyze the information of the SIB1 message 15 and may detect the additional special subframe configuration 9. In this regard, the processor of a UE may utilize the information of the additional special subframe configuration 9 to communicate with the eNB 12. By broadcasting the SIB1 message 15 to UEs of a system, one or more UEs that are TDD Rel-11 UEs may receive the additional special subframe configuration 9 via a signal from the eNB 12. By utilizing the SIB1 message 15, the backward compatible feature of one or more legacy TDD UEs may not be impacted by the new defined RRC parameter and/or information element indicating the additional special subframe configuration 9, since these legacy TDD UEs may be incapable of reading the additional special subframe configuration 9 and instead may utilize the special subframe configuration 5 to communicate with eNB 12.

In another alternative example embodiment, the processor 24 of the eNB 12 may include one or more new defined RRC parameters and/or information elements having an additional special subframe configuration 9 in a UE dedicated RRC signal(s) such as, for example, in a message (e.g., a RRCConnectionReconfiguration message). The one or more new defined RRC parameters and/or information elements included in the UE dedicated signaling may include, but are not limited to, the TDD-Config information element 4, the new RRC parameter 5, the TDD-Config information element 7, new parameter 8, and/or TDD-Config information element 11 which are associated with TDD-Config-R11.

Referring now to FIG. 12, a diagram of UE dedicated RRC signaling is provided according to an example embodiment. The UE dedicated RRC signaling may be a message such as, for example, a RRCConnectionReconfiguration message 17. The processor 24 of the eNB 12 may generate the RRCConnectionReconfiguration message to include one or more newly defined RRC parameters and/or information elements (e.g., the TDD-Config information element 4, the new RRC parameter 5, the TDD-Config information element 7, new parameter 8, and/or TDD-Config information element 11) having the additional special subframe configuration 9.

The processor 24 of eNB 12 may provide the RRCConnectionReconfiguration message 17 to one or more UEs (e.g., UEs 10 (e.g., TDD Rel-11 UEs)). The processor of a UE may analyze the data of the RRCConnectionReconfiguration message 17 and may detect the additional special subframe configuration 9. In this regard, a processor of the UE may configure and utilize the information of the additional special subframe configuration 9 to communicate with the eNB 12. As such, the UBs (e.g., UEs 10) that are TDD Rel-11 UEs may utilize the additional special subframe configuration 9 without considering backward compatible issues. In other words, backward compatible issues associated with legacy TDD UEs (e.g., which are not compliant with TDD Rel-11) are generally not raised since the RRCConnectionReconfiguration message 17 is UB dedicated RRC signalling that may be sent by the processor 24 of the eNB 12 to particular UEs 10 that are TDD Rel-11 UEs.

In one example embodiment, in an instance in which a TDD UL-DL configuration in UE dedicated RRC signaling received by a UE is determined by the UB to be different than a SIB1 message indicated in a TDD UL-DL configuration received by the UE, the processor (e.g., processor 34) of the UE may regard this discrepancy as a RRC configuration failure and may discard the UE dedicated RRC signaling. For purposes of illustration and not of limitation, in an instance in which a processor of a UB detects that a SIB1 message indicates a subframeAssignment is TDD UL-DL subframe configuration 1 and that UE dedicated signaling indicates a subframeAssignment in TDD-Config-R11 is TDD UL-DL subframe configuration 2, the processor (e.g., processor 34) of the UE may regard this discrepancy as a RRC configuration failure and may discard the UE dedicated RRC signaling (e.g., subframe configuration 2).

In another example embodiment, the processor 24 of an eNB 12 may designate a one-to-one mapping between a legacy special subframe configuration and an additional special subframe configuration (e.g., special subframe configuration 9). For example, the processor 24 of the eNB 12 may map the legacy special subframe configuration 5 for normal processing to the additional special subframe configuration 9 for normal CP. As such, in an instance in which a processor of a UEB (e.g., a TDD Rel-11 UE) detects the special subframe configuration 5 in a message (e.g., an SIB1 message) from the eNB 12, the processor of the UE may identify the mapping to the additional special subframe configuration 9 and may utilize the additional special subframe configuration 9 to communicate with the eNB 12. A benefit of this example embodiment is that the eNB 12 may not need to utilize an extra signalling procedure to support the additional special subframe configuration 9. Also, the impact of backward compatible issues may be minimized since the legacy TDD UEs may utilize the special subframe configuration 5.

Referring now to FIG. 13, a flowchart is provided of an example method for enabling provision of one or more additional special subframe configurations to one or more communication devices. At operation 1300, an apparatus (e.g., eNB 12) may include means, such as the processor 24 and/or the like for generating one or more parameters (e.g., RRC parameter 5, new parameter 8, etc.) defining a new special subframe configuration (e.g., additional special subframe configuration 9 for normal Cyclic Prefix in downlink) associated with downlink communications. The new special subframe configuration is generated in addition to one or more other special subframe configurations (e.g., legacy special subframes configurations 0-8). The new special subframe configuration includes information indicating a plurality of downlink symbols (e.g., six) that exceed a number of downlink symbols (e.g., three) of at least one of the other special subframe configurations (e.g., special subframe configuration 5) which reduces overlap between a first system (e.g., an LTE TDD system) and a second system (e.g., a TD-SCDMA system). The plurality of downlink symbols may minimize interference between the first system and the second system and increases utilization of resources (e.g., transmission of downlink data).

At operation 1305, an apparatus (e.g., eNB 12) may include means, such as the processor 24 and/or the like for providing a message (e.g., a SIB1 message, a UE dedicated RRC signal(s) (e.g., a RRCConnectionReconfiguration message)) to one or more communication devices to enable at least a first subset of the communication devices (e.g., UEs 10) to detect the new special subframe configuration (e.g., additional special subframe configuration 9).

Referring now to FIG. 14, a flowchart is provided of an example method for facilitating provision of one or more additional special subframe configurations. At operation 1400, an apparatus (e.g., UE 10) may include means, such as the processor 34 and/or the like for receiving a message from a network device (e.g., an eNB 12). The message (e.g., a SIB1 message, a UE dedicated RRC signal(s) (e.g., a RRCConnectionReconfiguration message)) may include one or more special subframe configuration parameters.

At operation 1405, an apparatus (e.g., UE 10) may include means, such as the processor 34 and/or the like for analyzing the message to determine whether the parameters identify a defined new special subframe configuration (e.g., an additional special subframe configuration 9) associated with downlink communications in which the new special subframe configuration is generated in addition to one or more other special subframe configurations (e.g., legacy special subframes configurations 0-8).

The new special subframe configuration may include information indicating a plurality of downlink symbols (e.g., six) that exceed a number of downlink symbols (e.g., three) of at least one of the other special subframe configurations (e.g., special subframe configuration 5) which reduces overlap between a first system (e.g., an LTE TDD system) and a second system (e.g., a TD-SCDMA system). The plurality of downlink symbols may minimize interference between the first system and the second system and increases utilization of resources (e.g., transmission of downlink data).

It should be pointed out that FIGS. 13 and 14 are flowcharts of a system, method and computer program product according to an example embodiment of the invention. It will be understood that each block of the flowcharts, and combinations of blocks in the flowcharts, can be implemented by various means, such as hardware, firmware, and/or a computer program product including one or more computer program instructions. For example, one or more of the procedures described above may be embodied by computer program instructions. In this regard, in an example embodiment, the computer program instructions which embody the procedures described above are stored by a memory device (e.g., memory 26, memory 36) and executed by a processor (e.g., processor 24, processor 34). As will be appreciated, any such computer program instructions may be loaded onto a computer or other programmable apparatus (e.g., hardware) to produce a machine, such that the instructions which execute on the computer or other programmable apparatus cause the functions specified in the flowcharts blocks to be implemented. In one embodiment, the computer program instructions are stored in a computer-readable memory that can direct a computer or other programmable apparatus to function in a particular manner, such that the instructions stored in the computer-readable memory produce an article of manufacture including instructions which implement the function(s) specified in the flowcharts blocks. The computer program instructions may also be loaded onto a computer or other programmable apparatus to cause a series of operations to be performed on the computer or other programmable apparatus to produce a computer-implemented process such that the instructions which execute on the computer or other programmable apparatus implement the functions specified in the flowcharts blocks.

Accordingly, blocks of the flowcharts support combinations of means for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In an example embodiment, an apparatus for performing the methods of FIGS. 13 and 14 above may comprise a processor (e.g., the processor 24, processor 34) configured to perform some or each of the operations (1300-1305, 1400-1405) described above. The processor may, for example, be configured to perform the operations (1300-1305, 1400-1405) by performing hardware implemented logical functions, executing stored instructions, or executing algorithms for performing each of the operations. Alternatively, the apparatus may comprise means for performing each of the operations described above. In this regard, according to an example embodiment, examples of means for performing operations (1300-1305, 1400-1405) may comprise, for example, the processor 24 (e.g., as means for performing any of the operations described above), the processor 34 and/or a device or circuitry for executing instructions or executing an algorithm for processing information as described above.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method, comprising:
generating, by a base station, one or more parameters defining a new special subframe configuration associated with downlink communications, the new special subframe configuration is generated in addition to another special subframe configuration, the new special subframe configuration comprising information indicating a plurality of downlink symbols that exceed a number of downlink symbols of the other special subframe configuration; and
transmitting, from the base station, a message to one or more communication devices, wherein
the message includes the one or more parameters to enable at least a first subset of the one or more communication devices to detect the new special subframe configuration, and
the message enables a second subset of the one or more communication devices to detect and utilize the other special subframe configuration in an instance that the second subset of the communication devices are not capable of reading the new special subframe configuration.

2. The method of claim 1, further comprising prior to transmitting the message, including the new special subframe configuration in the message.

3. The method of claim 1, further comprising prior to transmitting the message, including the at least one other special subframe configuration in the message.

4. The method of claim 1, wherein the one or more parameters defining the new special subframe configuration are included in a Time Division Duplex Configuration information element.

5. The method of claim 1, wherein
the message comprises a System Information Block Type 1 (SIB1) message, and
the transmitting the message is performed by broadcasting the SIB1 message to the one or more communication devices.

6. An apparatus comprising;
at least one processor; and
at least one memory including computer program code that is executed by the at least one processor to cause the apparatus to:
generate one or more parameters defining a new special subframe configuration associated with downlink communications, the new special subframe configuration is generated in addition to another special subframe configuration, the new special subframe configuration comprising information indicating a plurality of downlink symbols that exceed a number of downlink symbols of the other special subframe configuration; and
transmit a message to one or more communication devices, wherein
the message includes the one or more parameters to enable at least a first subset of the one or more communication devices to detect the new special subframe configuration, and
the message enables a second subset of the one or more communication devices to detect and utilize the other special subframe configuration in an instance that the second subset of the communication devices are not capable of reading the new special subframe configuration.

7. The apparatus of claim 6, wherein prior to transmitting the message, the apparatus includes the new special subframe configuration in the message.

8. The apparatus of claim 7, wherein prior to transmitting the message, the apparatus includes the at least one other special subframe configuration in the message.

9. The apparatus of claim 6, wherein
the new special subframe configuration comprises an additional special subframe configuration 9 for a normal Cyclic Prefix, and
the one other special subframe configuration comprises a special subframe configuration 5 for a normal Cyclic Prefix.

10. The apparatus of claim 6, wherein
the apparatus operates as part of a Time Division Duplex Long Term Evolution System, and
the apparatus shares a site or operates on an adjacent frequency to a Time Division Synchronous Code Division Multiple Access system.

11. The apparatus of claim 6, wherein the one or more parameters defining the new special subframe configuration are included in a Time Division Duplex Configuration information element.

12. The apparatus of claim 11, wherein the other special subframe configuration is included in the Time Division Duplex Configuration information element.

13. The apparatus of claim 6, wherein
the message comprises a System Information Block Type 1 (SIB1) message, and
the apparatus transmits the message by broadcasting the SIB1 message to the one or more communication devices.

14. The apparatus of claim 6, wherein the message comprises one or more User Equipment (UE) dedicated Radio Resource Control (RRC) signals.

15. The apparatus of claim 6, wherein prior to transmitting the message, the apparatus is caused to:
map the new special subframe configuration to the other special subframe configuration;
designate one of the parameters as a switching bit comprising a value to indicate whether the new special subframe configuration is enabled or disabled;
include information defining the mapping and the switching bit in the message; and
transmit the message enabling at least one communication device of the first subset to detect and utilize the new special subframe configuration based in part on an evaluation of the information defining the mapping in an instance in which the at least one communication device detects that the message identifies the other special subframe configuration and the value of the switching bit indicates that the new special subframe configuration is switched on.

16. The apparatus of claim 6, wherein prior to transmitting the message, the apparatus is caused to:
map the new special subframe configuration to the other special subframe configuration;
include information defining the mapping in the message; and
transmit the message enabling at least one communication device of the first subset to detect and utilize the new special subframe configuration based in part on an evaluation of the information defining the mapping in an instance in which the at least one communication device detects that the message identifies the at least one other special subframe configuration.

17. An apparatus comprising:

at least one processor; and at least one memory including computer program code that is executed by the at least one processor to cause the apparatus to:

receive a message from a network device, the message comprising one or more special subframe configuration parameters;

analyze the message to determine whether the parameters define a new special subframe configuration associated with downlink communications, and that the new special subframe configuration is generated in addition to another special subframe configuration, the new special subframe configuration comprising information indicating a plurality of downlink symbols that exceed a number of downlink symbols of the other special subframe configuration; and detect and utilize the new special subframe configuration based on evaluating information defining a mapping of the new special subframe configuration to the other special subframe configuration in response to determining that the message defines the at other special subframe configuration.

18. The apparatus of claim 17, wherein the message comprises a System Information Block Type 1 (SIB1) message.

19. The apparatus of claim 17, wherein the apparatus is further caused to:

determine whether a first subframe configuration in UE dedicated RRC signals is different from a second subframe configuration indicated in a System Information Block Type 1 (SIB1) message received from the network device; and discard the UE dedicated RRC signals in response to determining that the first subframe configuration and the second subframe configuration are different.

20. The apparatus of claim 17, wherein the apparatus detects and utilizes the new special subframe configuration based on the evaluating the information in response to detecting that the message identifies the other special subframe configuration and a value of a switching bit indicates that the new special subframe configuration is switched on.

* * * * *